United States Patent Office 2,867,671
Patented Jan. 6, 1959

2,867,671

DEHYDROGENATION OF SATURATED AROMATIC HYDROCARBON TO A CYCLOOLEFIN IN THE PRESENCE OF FREE BROMINE

Richard D. Mullineaux, Oakland, and John H. Raley, Walnut Creek, Calif., assignors to Shell Development Company, New York, N. Y., a corporation of Delaware No Drawing. Application July 30, 1956
Serial No. 600,662

5 Claims. (Cl. 260—666)

This invention relates to an improved process for the production of hydroaromatic cycloolefins.

Hydroaromatic cyclomonoolefins, particularly cyclohexene, are highly desired intermediate compounds for the production of a variety of useful chemicals such as cyclohexanol and its homologs, cyclohexanone, caprolactam, cyclohexanediol and adipic acid. Hydroaromatic cycloolefins do not occur to a substantial extent in commercially available raw materials. Although large amounts of cyclohexane and other hydroaromatic naphthenes are found in petroleum, no process has been developed to date by which a saturated hydroaromatic hydrocarbon can be directly and easily converted into a product comprising more than a very small proportion, e. g. about 5%, cyclohexene in a single conversion step. In the known catalytic processes for conversion of saturated hydroaromatic hydrocarbons the preponderant product of dehydrogenation is always an aromatic, e. g. benzene, which occurs in proportions that are several times as large as the amount of cycloolefin, usually ten times or more, at any reasonable level of conversion per pass.

It is an object of this invention to provide an improved process for the conversion of saturated hydroaromatic hydrocarbons to the corresponding hydroaromatic monoolefins. It is a specific object of the invention to provide an improved process for the conversion of cyclohexane to cyclohexene.

It has now been found, in accordance with this invention, that hydroaromatic hydrocarbons can be converted to hydrocarbon product mixtures in which the content of the hydroaromatic olefin corresponding to the saturated feed is very high while the amount of the aromatic hydrocarbon corresponding to the saturated feed remains relatively low, at unusually high conversions per pass. This result is obtained by subjecting a mixture of the feed hydrocarbon and an amount of elemental bromine in the range between 0.1 mole and about 1 mole of bromine per mole of feed hydrocarbon to a temperature of at least 400° C. in vapor phase for a relatively short time and recovering the desired cycloolefin product from the reaction mixture.

The bromine is preferably supplied as molecular bromine ($Br_2$) but may be furnished by means of a bromine compound which yields free bromine, either molecular or atomic, at the reaction conditions. References hereinafter to bromine are meant to include equivalent amounts of such compounds, such as alkyl 1,2-dibromides, e. g. 1,2-dibromoethane. Hydrogen bromide does not react to supply bromine under the conditions of the process.

This invention can be carried out by passing a vaporized mixture of the feed hydrocarbon with from 0.1 to about 1 mole of elemental bromine per mole of feed through a reaction zone maintained at a temperature of at least 400° C., generally from 500° C. to 800° C., and preferably from 550° to 750° C. The reaction zone can be provided in an unobstructed tube.

The reactor may be, for example, an externally heated metal vessel lined with corrosion-resistant metal, such as platinum, or with heat- and corrosion-resistant ceramic material. The nominal residence time of the mixture in the reaction zone is generally from 0.001 to 10 seconds. The reacted mixture is drawn from the reaction zone and separated to recover the desired cycloolefin. It is possible to obtain a very high ultimate conversion of the cycloparaffin feed to cycloolefin by recovering the aromatic product from the reaction mixture, hydrogenating it to the corresponding saturated hydroaromatic compound and returning this as additional feed to the dehydrogenation reaction zone.

The process is carried out at various pressures, from subatmospheric to superatmospheric pressures, in vapor phase. Although atmospheric pressure is suitable and is advantageous in most cases, higher pressures, e. g. up to 500 or even 1000 lbs. per square inch can be employed.

In general, the nominal residence time of the reactants at the selected reaction conditions should be at least about 0.001 second and usually at least 0.01 second. Preferred nominal residence times are in the range from 0.001 to 2 seconds. Residence times of 10 seconds or more can be used but are not generally required.

"Nominal residence time" is the calculated length of time during which the reaction mixture would be in the reaction zone if the number of moles of product mixture were equal to the number of moles of feed mixture. Since the number of moles of product exceeds the moles of feed, the actual residence time is somewhat shorter than the nominal residence time. By maintaining relatively low residence times in the present process, the reverse reaction of hydrogen bromide—which results from the reaction of bromine and feed—with product or intermediates to form more saturated compounds is suppressed. This applies particularly to suppression of the reaction of hydrogen bromide with the cyclomonoolefins, which would lead to their being reconverted to the cycloparaffin. The aromatics are extremely resistant to the reverse reaction under any conditions.

An important factor in the practice of this invention is the ratio of elemental bromine to hydrocarbon in the reaction mixture. A minimum ratio of at least about 0.1 mole of bromine per mole of reactants is always employed. Since the reaction between hydrocarbon and bromine under the conditions of this invention is not equilibrium limited, essentially all bromine charged, up to the stoichiometrical equivalent for complete dehydrogenation, is converted to hydrogen bromide in the dehydrogenation reaction zone, resulting in the equivalent amount of dehydrogenation of the feed hydrocarbon. In order to produce a substantial proportion of the cyclomonoolefin in the reaction product it is therefore essential to contact the hydrocarbon with less than or not substantially more than 1 mole of bromine per mole of feed hydrocarbon and preferably with an amount in the range from 0.5 to 1 mole of bromine to hydrocarbon and more preferably from 0.5 to 0.75 mole per mole.

It will be understood that where conversion of bromine to hydrogen bromide is referred to herein, the degree of such conversion may be reduced by a relatively small proportion of bromine which appears in the product in the form of organic bromides.

The invention will be further illustrated by means of the following examples, which are not, however, to be construed as limiting the invention.

EXAMPLE I

Run No. 1 was carried out by passing a vaporous feed mixture of cyclohexane and free bromine, at a mole ratio of bromine ($Br_2$) to cyclohexane of 0.3:1, through a reaction zone consisting of an unobstructed heated quartz tube, 1 cm. diameter and having 35 cc. volume, at one atmosphere pressure and 500° C. The nominal residence time was 0.7 second. The effluent from the reaction zone was quickly passed into intimate contact with an aqueous solution of sodium hydroxide which removed all hydrogen bromide from the vapor effluent stream as well as the remaining bromine. The resulting vapor stream, free of inorganic bromine species, was analyzed, as was the caustic solution. It was found that 25.0% of the cyclohexane had been converted, and 99.9% of the elemental bromine charged had been converted to hydrogen bromide and organic bromides.

Run No. 2 was carried out in a similar manner, but employing a bromine to cyclohexane mole ratio, in the feed, of 0.76:1 and a nominal residence time of 1.0 second. It was found that 63.8% of the cyclohexane charged, and 99.5% of the bromine charged were converted.

The analysis of the organic reaction products is given in Table 1. The first columns present the analysis of the total reactor effluent of each run and the second columns the yield of products on the basis of converted cyclohexane. In each case the values are expressed as moles of $C_6$ equivalent per 100 moles of cyclohexane.

Table 1

|  | Run 1 | |
| --- | --- | --- |
|  | Moles/100 Moles Feed | Moles/100 Moles Cyclohexane Converted |
| Product: |  |  |
| Cyclohexane | 75 |  |
| Cyclohexene | 10.0 | 40.0 |
| Cyclohexadiene | 0.1 | 0.4 |
| Benzene | 7.0 | 28.0 |
| Cracked Products | 0.1 | 0.4 |
| $C_6$ Bromides | 0.4 | 1.6 |
| Residue | 0.3 | 1.2 |
| Loss | 7.8 | 31.0 |
|  | Run 2 | |
| Product: |  |  |
| Cyclohexane | 36.2 |  |
| Cyclohexene | 17.8 | 28.0 |
| Cyclohexadiene | 0.5 | 0.8 |
| Benzene | 14.9 | 23.4 |
| Cracked Products | 0.1 | 0.2 |
| $C_6$ Bromides | 7.3 | 11.5 |
| Residue | 0.2 | 0.2 |
| Loss | 22.6 | 35.5 |

Runs 1 and 2 were carried out at similar conditions except that the bromine-to-cyclohexane mole ratio in run 2 was substantially higher than in run 1, resulting in a substantially higher conversion of cyclohexane. The conversions to cyclohexene (on a total product basis) were 10 and 17.8 mole percent respectively. The yield of cyclohexene was particularly high in run 1 at the somewhat lower conversion. It was also noteworthy that in each case the ratio of cyclohexene to benzene was substantially in excess of 1:1.

The loss of material, i. e. hydrocarbon feed unaccounted for in the product, was very high in both cases due to mechanical imperfections in the apparatus employed. It is believed that most of this loss occurred before the feed entered the reactor. It is probable, therefore, that the actual yield of cyclohexene from cyclohexane in run 1 exceeded 50 mole percent and in run 2 was very nearly 50 mole percent.

EXAMPLE II

In a manner similar to the runs in Example I, a mixture of bromine and methylcyclohexane, at a mole ratio of 0.5:1, is contacted at a nominal residence time of 0.5 second at a temperature of 550° C. Under these conditions about 35 percent of the methylcyclohexane and about 100 percent of the bromine are converted. On a basis of converted methylcyclohexane, the product contains about 15 percent of methylcyclohexene, about 12 percent toluene and on the order of 8 percent of bromides, coke and cracked products.

The process of this invention is suitable for the conversion of saturated hydroaromatic hydrocarbons, including non-olefinic polycyclic compounds such as tetralin and decalin. The process is particularly applicable to the conversion of single ring hydroaromatic hydrocarbons which do not contain ring substituents other than hydrogen and methyl groups, e. g. cyclohexane, methylcyclohexane, the several dimethylcyclohexanes and polymethylcyclohexanes.

The feed charged to the reaction zone may be a pure single hydrocarbon of the class to be converted or it may be a mixture of several such hydrocarbons or it may be a mixture of the hydrocarbon to be converted with other hydrocarbons of different classes. It is preferred to convert a feed containing at least 50 percent of saturated hydroaromatic hydrocarbons and more particularly containing at least 85 percent.

The total reaction product may be treated, if desired, to separate therefrom quickly a fraction containing the inorganic bromine species and an organic fraction including unconverted feed as well as products. The organic product mixture is worked up in conventional manner, i. e. by fractional distillation, solvent extraction, adsorption, and the like, to separate the desired cyclomonoolefin, organic hydrocarbons and other materials.

In one mode of carrying out the process of this invention a feed consisting essentially only of a single compound, e. g. cyclohexane, is converted by contact with bromine at the defined reaction conditions. The reaction product is treated to remove inorganic bromine species therefrom e. g. by absorption in aqueous sodium hydroxide, and the remaining organic phase is separated by fractional distillation to recover separately cyclomonoolefin product, aromatic product and unconverted feed, e. g. cyclohexene, benzene and cyclohexane. The aromatic (benzene) is then contacted with hydrogen under conditions suitable for conversion thereof to the hydroaromatic (cyclohexane). Such conditions are described for example in U. S. Patents 2,373,501 to Peterson and 2,391,283 to Weber et al. The conditions include contact of the aromatic and at least a stoichiometric amount of hydrogen, at temperatures in the range from room temperature to 350° C., with a catalyst prepared, for example, by leaching a nickel aluminum alloy with a cold sodium hydroxide solution followed by consecutive displacement with cold water, methanol and cyclohexane. The hydroaromatic product of this conversion, e. g. cyclohexane, is then returned to further reaction with bromine to produce additional amounts of the cyclomonoolefin.

We claim as our invention:

1. A process for the dehydrogenation of a saturated hydroaromatic hydrocarbon to a corresponding cycloolefin which comprises subjecting a mixture of a compound selected from the group consisting of saturated monocyclic hydroaromatic hydrocarbons, decalin and tetralin and from 0.1 to about 1 mole of free bromine per mole of feed hydrocarbon in vapor phase to a temperature of at least about 400° C. for a short time to produce a total reaction product in which the content of hydroaromatic olefin is very high while the amount of aromatic product is relatively low and recovering cycloolefin from said product.

2. A process for the dehydrogenation of a saturated monocyclic hydroaromatic hydrocarbon to a corresponding cycloolefin which comprises subjecting in an unobstructed reaction zone a mixture consisting of said hydrocarbon and from 0.1 to about 1 mole of free bromine per mole of said hydrocarbon in vapor phase to a temperature in the range from 400 to 800° C. for a time from 0.001 to 10 seconds to produce a total reaction product having a cycloolefin-to-aromatics ratio of at least about 1:1, promptly removing inorganic bromine species from the resulting product mixture, and recovering cycloolefin from the remaining organic product mixture.

3. A process according to claim 2 in which said saturated hydroaromatic hydrocarbon is cyclohexane.

4. A process according to claim 2 in which said saturated hydroaromatic hydrocarbon is methylcylohexane.

5. A process according to claim 2 in which resulting aromatic hydrocarbon is recovered from said product mixture, contacted with hydrogen under hydrogenating conditions to convert it to the corresponding saturated hydroaromatic hydrocarbon, and the latter is returned to further contact with bromine.

References Cited in the file of this patent

UNITED STATES PATENTS

| | | |
|---|---|---|
| 1,925,421 | Van Peski | Sept. 5, 1933 |
| 2,315,499 | Cantzler et al. | Apr. 6, 1943 |
| 2,546,234 | Pelzer | Mar. 27, 1951 |
| 2,588,867 | Morris | Mar. 11, 1952 |
| 2,642,463 | Arnold et al. | June 16, 1953 |

FOREIGN PATENTS

| | | |
|---|---|---|
| 54,597 | Holland | May 15, 1943 |

OTHER REFERENCES

Epstein et al.: Journal of Research of the National Bureau of Standards, vol. 42, April 1949, pp. 379–382 (page 381 only relied on).

"Chlorination of Paraffins and Cycloparaffins," by McBee and Ungrade, in "The Chemistry of Petroleum Hydrocarbons," vol. 3, Reinhold Pub. Co., New York, 1955, pages 70 and 71.